Dec. 1, 1953 T. B. JOCHEM ET AL 2,661,401
ADJUSTABLE MULTIPOSITION ELECTRICAL CONTROLLER
Filed Aug. 9, 1950 2 Sheets-Sheet 1
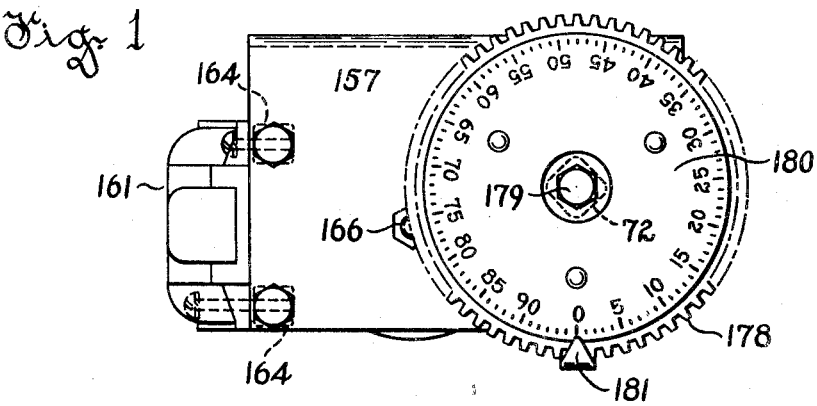
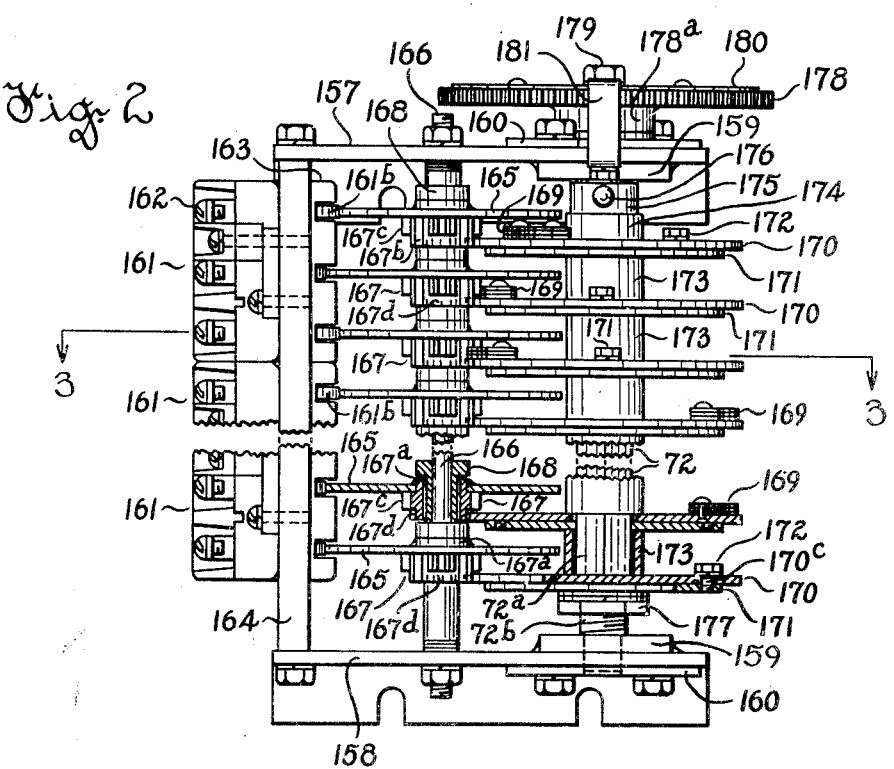
Inventors
Theodore B. Jochem
Harold L. Mikelburg
By W. Lyon
Attorney

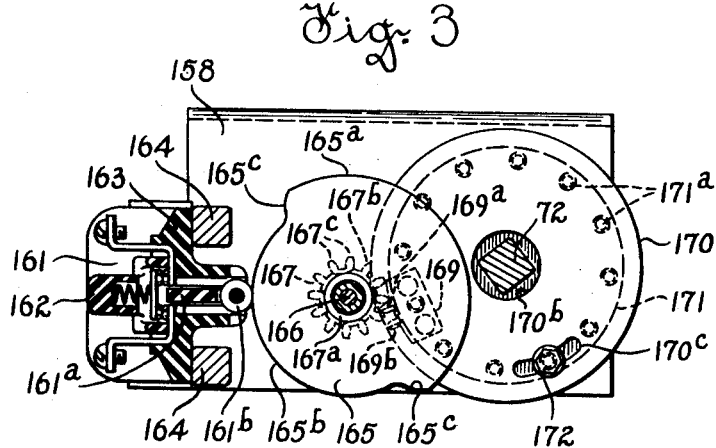
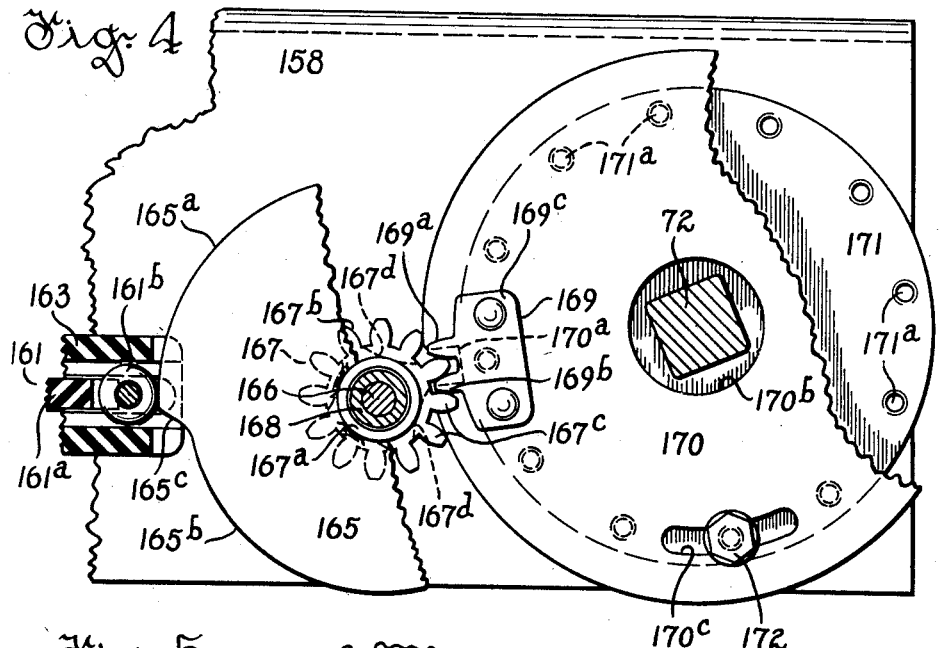
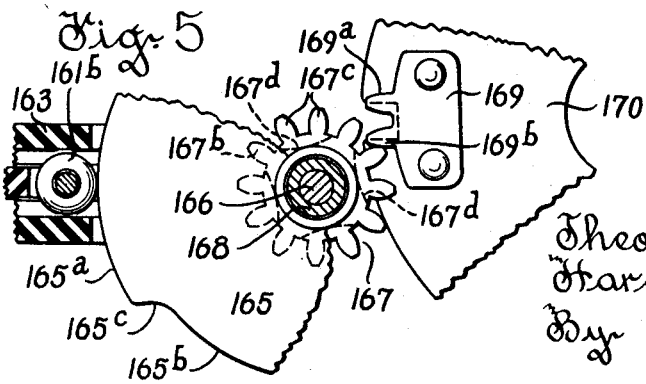

Patented Dec. 1, 1953

2,661,401

UNITED STATES PATENT OFFICE 2,661,401

ADJUSTABLE MULTIPOSITION ELECTRICAL CONTROLLER

Theodore B. Jochem, Wauwatosa, and Harold L. Mekelburg, Milwaukee, Wis., assignors to Cutler-Hammer, Inc., Milwaukee, Wis., a corporation of Delaware Application August 9, 1950, Serial No. 178,472

8 Claims. (Cl. 200—18)

This invention relates to an adjustable multi-position electrical controller.

The subject matter of the present invention is disclosed, but not claimed, in the copending application of Theodore B. Jochem, for Multi-Position Electrical Controller, Serial No. 171,854, filed July 3, 1950.

A primary object of the present invention is to provide a multi-position electrical controller carrying a multiplicity of commutating switches which are individually adjustable in respect of their operation in the operating cycle of the controller.

Another object is to provide a controller of the aforementioned type wherein the operation of the commutating switches can be readily adjusted without need for replacement of parts or special tools to effect such adjustments, and A still further object is to improve the details of construction and operation of the various component parts of a controller of the aforementioned character.

Other objects and advantages of the invention will hereinafter appear.

The accompanying drawings illustrate a preferred embodiment of the invention which will now be described, it being understood that the embodiment shown is susceptible of modification in respect of its details without departing from the scope of the appended claims.

In the drawings,

Figure 1 is a view in top plan of the controller;

Fig. 2 is a view in side elevation of the controller;

Fig. 3 is a view taken substantially along the line 3—3 of Fig. 2,

Fig. 4 is an enlarged fragmentary view, similar to Fig. 3, but showing certain portions cut away and certain of the parts in a different operating relation, and Fig. 5 is similar to Fig. 4, but showing certain of the parts in a still different operating relation.

Referring to the drawings, they show a controller having a an operating shaft 72 supported in brackets 157 and 158 on ball bearings (not shown). Annular rings 159 are welded to the lower and upper surfaces of brackets 157 and 158, respectively, to afford added bearing surface for the ball bearings. Shaft 72 and its associated ball bearings are constrained against movement upwardly or downwardly relative to brackets 157 and 158 by plates secured to the upper and lower surfaces of brackets 157 and 158, respectively.

The controller comprises a plurality of plunger operated switch units 161, similar in construction and arrangement to those disclosed in Patent No. 2,521,519, granted September 5, 1950, to Richard B. Hunter and Harold L. Mekelburg. Switch units 161 are enclosed and supported in vertically alined groups of three in pairs of interfitting, molded insulating blocks 162 and 163 which are similar in general arrangement and construction to corresponding switch supporting blocks shown in the last mentioned application. Each of the switch units 161 is biased to circuit-closed position and has a plunger actuator 161a with a roller follower 161b attached to the end thereof. A plurality of the interfitting switch blocks 162 and 163 are supported in a vertical row on a pair of supporting shafts 164 which are rigidly secured at their top and bottom ends to brackets 157 and 158, respectively.

Each of the roller followers 161b of the switch units 161 has associated therewith an operating cam 165. The cams 165 are carried on a shaft 166 which is non-rotatably secured to the brackets 157 and 158. Each of the cams 165 is secured, as by welding, to a hub portion 167a of a gear 167 which extends through a clearance opening in the cam. The assembly comprising a cam 165 and a gear 167 is rotatably mounted on a flanged bushing 168 which is non-rotatably mounted on shaft 166. The upper ends of each of the bushings 168 seats against the lower surface of a gear 167 and serve to space adjacent cam and gear assemblies from each other on shaft 166. Spacing collars and shims are positioned on shaft 166 above the uppermost bushing 168 and the lowermost gear 167 to space the plurality of cam, gear and bushing assemblies properly between the brackets 157 and 158.

The gears 167 are a special form of twelve tooth gear having four teeth 167b extending across the full width of the gear and spaced at rotary angles of 90° about the periphery of the gear, and have eight teeth 167c extending from one face of the gear only part way across the width thereof. A pair of the teeth 167c are interposed between any two of the full length teeth 167b. The teeth 167b and 167c have the same profile and are equally spaced about the periphery of gear 166. Four arcuate concaved depressions 167d are formed in the hub portion 167a adjacent the ends of the pairs of teeth 167c.

An assembly comprising a laminated two-toothed gear sector 169 and a notched circular disc 170 cooperate to afford intermittent drive and locking of each of the gears 167. Gear sector 169 comprises teeth 169a and 169b which are integrally formed with a bracket portion 169ᶜ. Sector 169 is rigidly secured to the disc 170 so that the notch between the teeth of the former alines with a correspondingly formed notch 170ᵃ in the latter. The pitch radius of the combination of sector 169 and disc 170 is preferably in a ratio of 4:1 with respect to that of gear 167. Disc 170 is provided with a central clearance opening 170ᵇ for shaft 72 and is also provided with an elongated arcuate opening 170ᶜ. Opening 170ᶜ is preferably formed in respect of its arcuate longitudinal dimension so that radial lines intersecting the ends of said openings are spaced at an angle of 30°. Disc 170 is adjustably, non-rotatably secured to a disc 171 by means of a bolt 172 penetrating opening 170ᶜ and taking into one of twelve threaded openings 171ᵃ formed in disc 171. Disc 171 is preferably smaller in outer diameter than disc 170 and is provided with a square central opening to receive the corresponding square portion 72ᵃ of operating shaft 72, thereby insuring non-rotatable securement of said disc on shaft 72. The openings 171ᵃ are preferably spaced at equal radial angles of 30° and lie adjacent the periphery of disc 171.

The assemblies comprising gear sector 169, disc 170 and disc 171 are spaced from the other such assemblies on the portion 72ᵃ of shaft 72 by annular spacing collars 173 positioned on said shaft. The plurality of such assemblies are spaced appropriately at the upper end thereof from bracket 157 by a spacing collar 174 and a spacing collar 175 which is secured to shaft 72 by a rivet 176 penetrating the latter collar and shaft 72. At their lower end, the plurality of the assemblies are adjustable with respect to their spacing relative to bracket 158 by means of a nut 177 threadedly engaging a threaded portion 72ᵇ on operating shaft 72.

Operating shaft 72 extends upwardly beyond the upper surface of bracket 158 and adjacent its upper end is provided with a portion (not shown) which is square in horizontal cross section. A gear 178 having a hub portion 178ᵃ, with a correspondingly square opening formed therein to accommodate the last mentioned portion of shaft 72, is secured to shaft 72 by means of a bolt 179 taking into a threaded recess formed in the upper end of the shaft. A circular indicia plate 180 is riveted to the upper surface of gear 178 and is provided with ninety-six equally spaced marks. Every fifth mark is preferably numerically indicated starting from zero (0). A stationary position indicator 181, having a pointed end overlying the edge of plate 180, is rigidly secured to bracket 157.

The cam surfaces of the cams 165 are provided with a "high" portion 165ᵃ extending peripherally for 168° and with a "low" portion 165ᵇ extending peripherally for the same number of degrees. The transition from the "high" to the "low" portions of the cams is provided by portions 165ᶜ which extend peripherally for 12° therebetween.

Referring to Fig. 3, it depicts the operating condition of the controller just prior to commencement of drive of one of the cams 165 for effecting commutation of its associated switch unit 161. Let it be assumed that shaft 72 is being driven in the clockwise direction. Tooth 169ᵃ of gear sector 169 has just engaged with a tooth of gear 167 and upon continued rotation of shaft 72, gear 167 and cam 165 will be driven anticlockwise a total rotary angle of 90°, during which time the roller follower 161ᵇ of an associated plunger 161ᵃ will ride up from the lower portion 165ᵇ, on portion 165ᶜ, onto the high portion 165ᵃ of the cam surface, thereby effecting opening of the contacts in a switch unit 161. Fig. 4 depicts an intermediate point in the rotation of cam 165 where the roller follower 161ᵇ has just ridden up onto the portion 165ᵃ of cam 165; cam 165 having been driven a rotary angle of 60° from the position depicted in Fig. 3. Cam 165 will then continue to rotate another 30° before completion of its movement in the anticlockwise direction; roller follower 161ᵇ riding farther onto the portion 165ᵃ a corresponding amount, as shown in Fig. 5. Drive of cam 165 anticlockwise through a rotary angle of 90° is completed when the tooth 169ᵇ just disengages from gear 167, and thereafter gear 167 and cam 165 are locked against further rotation by the periphery of disc 170 projecting within a depression 167ᵈ of gear 167.

It will be apparent that upon rotation of shaft 72 in the anticlockwise direction, the starting condition of drive of cam 165 in the clockwise direction will be depicted by Fig. 5, an intermediate condition just prior to operation of switch unit 161 to effect closure of its contacts will be depicted by Fig. 4, and the condition at the completion of rotation of cam 165, wherein it is again locked, will be depicted by Fig. 3. The arrangement permits operation of each of the switch units 161 once in each revolution of shaft 72, either in the clockwise or anticlockwise direction.

Operation of the switch units 161 by a cam 165 may be adjusted to occur between any two of ninety-six positions in the rotation of shaft 72, as indicated upon indicia plate 180. For example, suppose it is desired that closure of the switch unit shown in Fig. 3 be effected between positions "91" and "90" when shaft 72 is driven anticlockwise. Shaft 72 is first rotated until the mark "91" on indicia plate 180 alines with the end of indicator 181. Then bolt 172 is loosened and withdrawn from disc 171, through opening 170ᶜ in disc 170, and the assembly comprising disc 170 and gear sector 169 is shifted relative to disc 171 so that the intermediate operating condition depicted in Fig. 4 is effected. Bolt 172 is then reinserted through opening 170ᶜ and taken down into an opening 171ᵃ in disc 171 which alines with opening 170ᶜ. Thereafter operation of the switch unit from open to closed condition of its contacts will be afforded whenever shaft 72 in rotating anticlockwise moves from position "91" to position "90," and conversely the contacts of the switch unit will be operated from closed to open condition whenever shaft 72 rotating clockwise moves from position "90" to position "91."

It will be appreciated that any one of the switch units 161 may be adjusted with respect to its point of operation in the rotation of shaft 72 by following the procedure outlined above.

While in the embodiment shown, drive of operating shaft 72 will be through a gear or gear train, such as for example as shown in the aforementioned copending application, it will be apparent that a manual operating lever can be substituted for gear 178. It will be appreciated that although no mechanism is disclosed to afford definite operating positions for shaft 72 corresponding to the indicia markings on plate 180, this can be achieved through the use of known forms of star wheel or ratcheting mechanisms incorporated with shaft 72 directly if desired.

We claim:
1. In a switching controller, in combination, an operating shaft rotatable in reverse direc- tions, a relatively stationary shaft, a disc cam rotatably mounted on said stationary shaft, a switch having a reciprocably movable actuating element biased for continuous engagement with the edge of said cam, said cam upon drive through a given angle in reverse directions affording opening and closing of said switch, an element fixed to said operating shaft, and intermittent type gear driving connections between said element and said cam affording drive of said cam through said given angle whenever said operating shaft rotates through a predetermined angle in each revolution thereof in reverse directions.

2. In a switching controller, in combination, an operating shaft rotatable in reverse directions, a relatively stationary shaft, an assembly comprising a disc cam and a concentric gear member fixed to said cam rotatably mounted on said stationary shaft, a switch having a reciprocably movable actuating element biased for continuous engagement with the edge of said cam, said cam upon rotation through a given angle in reverse direction affording closing and opening of said switch, a concentric disc fixed to said operating shaft, an element fixed to said disc and carrying a gear sector engageable with said gear member to afford drive of said cam through said given angle whenever said operating shaft rotates through a predetermined angle in each revolution thereof in reverse directions.

3. In a switching controller, in combination, an operating shaft rotatable in reverse directions, a relatively stationary shaft, an assembly comprising a disc cam and a concentric gear member fixed to said cam rotatably mounted on said stationary shaft, a switch having a reciprocably movable actuating element biased for continuous engagement with the edge of said cam, said cam upon rotation through a given angle in reverse direction affording closing and opening of said switch, a concentric disc fixed to said operating shaft, a second disc disposed about said operating shaft in concentric and engaging relation with the first mentioned disc, means affording fixed but rotary adjustable securement of said discs to each other, and a gear sector fixed to said second disc engageable with said gear member to afford drive of said cam through said given angle whenever said operating shaft is rotated through a predetermined angle in each revolution thereof in reverse directions.

4. In a switching controller, in combination, an operating shaft rotatable in reverse directions, a relatively stationary shaft, an assembly comprising a disc cam and a concentric gear member fixed to said cam rotatably mounted on said stationary shaft, a switch having a reciprocably movable actuating element biased for continuous engagement with the edge of said cam, said cam upon rotation through a given angle in reverse directions affording closing and opening of said switch, a concentric disc fixed to said operating shaft, a second disc disposed about said operating shaft in concentric and engaging relation with the first mentioned disc, means affording fixed but rotary adjustable securement of said discs to each other, and a gear sector fixed to said second disc engageable with said gear member to afford drive of said cam through said given angle whenever said operating shaft is rotated through a predetermined angle in each revolution thereof in reverse directions, said means affording selection of any part of each revolution of said operating shaft for the aforementioned operation of said switch.

5. In a switching controller, in combination, an operating shaft rotatable in reverse directions, a relatively stationary shaft, an assembly comprising a disc cam and a concentric gear member fixed to said cam, rotatably mounted on said stationary shaft, said gear member having certain of its teeth extending the full width of said member and spaced at equal radial angles about the periphery and having other teeth, disposed between the former teeth, which extend only part way across the width of said member, a switch having a reciprocably movable actuating element biased for continuous engagement with the edge of said cam, a disc fixed to said operating shaft, a second disc disposed about said operating shaft in concentric and engaging relation with the first mentioned disc, means affording fixed but rotary adjustable securement of said discs to each other, and a gear sector fixed to said second disc engageable with the teeth of said gear member to afford drive of said cam through said given angle whenever said operating shaft is rotated through a predetermined angle in each revolution thereof, said second disc, whenever said gear sector is not engaged with said gear member, having a portion thereof disposed between a pair of said certain of said teeth to prevent any substantial rotation of said gear member and cam.

6. In a switching controller, in combination, a frame, an operating shaft rotatably supported by said frame, a plurality of switches supported in a row paralleling said operating shaft and having actuating elements individualized thereto, a relatively stationary shaft supported by said frame, a plurality of assemblies, each of which comprises a disc cam and a concentric gear member fixed to said cam, rotatably mounted on said stationary shaft, said cams each being individualized to a switch actuating element to effect closing and opening of an associated switch upon rotation thereof through a given angle in reverse directions, and a plurality of assemblies, each of which comprises a disc fixed to said operating shaft, a second disc disposed about the latter shaft in concentric and engaging relation with the first mentioned disc, means affording fixed but rotary adjustable securement of said discs to each other, and a gear sector fixed to said second disc and engageable with an associated gear member to afford drive of the latter through said given angle whenever said operating shaft is rotated a predetermined angle in each revolution in reverse directions.

7. In a switching controller, in combination, a frame, an operating shaft rotatably supported by said frame, a plurality of switches supported in a row paralleling said operating shaft and having actuating elements individualized thereto, a relatively stationary shaft supported by said frame, a plurality of assemblies, each of which comprises a disc cam and a concentric gear member fixed to said cam, rotatably mounted on said stationary shaft, said cams each being individualized to a switch actuating element to effect closing and opening of an associated switch upon rotation thereof a given angle in reverse directions, and a plurality of assemblies, each of which comprises a disc fixed to said operating shaft, a second disc disposed about the latter shaft in concentric and engaging relation with the first mentioned disc, means affording fixed but rotary adjustable securement of said discs to each other, and a gear sector fixed on said second disc and engageable with an associated gear member to afford drive of the latter through said given angle whenever said operating shaft is rotated a predetermined angle in each revolution in reverse directions, said means affording selection of any part of each revolution of said operating shaft for the aforementioned operation of a switch.

8. In a switching controller, in combination, a frame, an operating shaft rotatably supported by said frame, a plurality of switches supported in a row paralleling said operating shaft and having actuating elements individualized thereto, a relatively stationary shaft supported by said frame, a plurality of assemblies, each of which comprises a disc cam and a concentric gear member fixed to said cam, rotatably mounted on said stationary shaft, said cams each being individualized to a switch actuating element to effect closing and opening of an associated switch upon rotation thereof through a given angle in reverse directions, said gear members each having certain of their teeth extending the full width of said member and spaced at equal radial angles about the periphery and having other teeth, disposed between the former teeth, which extend only part way across the width of said member, and a plurality of assemblies, each of which comprises a disc fixed to said operating shaft, a second disc disposed about the latter shaft in concentric and engaging relation with the first mentioned disc, means affording fixed but rotary adjustable securement of said discs to each other, and a gear sector fixed on said second disc and engageable with an associated gear member to afford drive of the cam to which said member is fixed through said given angle whenever said operating shaft is rotated through a predetermined angle in each revolution thereof in reverse directions, said second discs each having a portion thereof disposed between a pair of the first mentioned teeth of its associated gear member to prevent any substantial rotation of the latter and its cam whenever its associated gear sector is not engaged with said associated gear member.

THEODORE B. JOCHEM.
HAROLD L. MEKELBURG.

References Cited in the file of this patent

UNITED STATES PATENTS

| Number | Name | Date |
|---|---|---|
| 1,848,349 | Jefferson | Mar. 8, 1932 |
| 1,949,101 | Greenewalt | Feb. 27, 1934 |
| 2,267,394 | Butler | Dec. 23, 1941 |
| 2,517,881 | Jaggi et al. | Aug. 8, 1950 |
| 2,521,519 | Hunter | Sept. 5, 1950 |